United States Patent
Lattanzio et al.

(10) Patent No.: US 10,562,001 B2
(45) Date of Patent: Feb. 18, 2020

(54) ADJUSTABLE LIFT ENGAGER

(71) Applicant: UOP LLC, Des Plaines, IL (US)

(72) Inventors: Louis A. Lattanzio, Des Plaines, IL (US); Gregory James Nedohin, Des Plaines, IL (US)

(*) Notice: Subject to any disclaimer, the term of this patent is extended or adjusted under 35 U.S.C. 154(b) by 190 days.

(21) Appl. No.: 15/849,167

(22) Filed: Dec. 20, 2017

(65) Prior Publication Data
US 2019/0184359 A1 Jun. 20, 2019

(51) Int. Cl.
| | |
|---|---|
| *B01J 8/18* | (2006.01) |
| *B65G 53/16* | (2006.01) |
| *B65G 53/42* | (2006.01) |
| *B65G 53/52* | (2006.01) |
| *B01J 8/00* | (2006.01) |
| *B01J 8/12* | (2006.01) |
| *C10G 49/00* | (2006.01) |
| *C10G 35/12* | (2006.01) |
| *B01J 8/26* | (2006.01) |

(Continued)

(52) U.S. Cl.
CPC ............... *B01J 8/001* (2013.01); *B01J 4/001* (2013.01); *B01J 8/002* (2013.01); *B01J 8/008* (2013.01); *B01J 8/0025* (2013.01); *B01J 8/12* (2013.01); *B01J 8/125* (2013.01); *B01J 8/18* (2013.01); *B01J 8/1845* (2013.01); *B01J 8/26* (2013.01); *B65G 53/16* (2013.01); *B65G 53/42* (2013.01); *B65G 53/52* (2013.01); *C01B 3/00* (2013.01); *C10G 35/12* (2013.01); *C10G 49/002* (2013.01); *B01J 2208/027* (2013.01); *C01B 2203/0822* (2013.01); *C10G 29/205* (2013.01); *C10G 35/10* (2013.01); *C10G 49/10* (2013.01)

(58) Field of Classification Search
None
See application file for complete search history.

(56) References Cited

U.S. PATENT DOCUMENTS

| | | | | |
|---|---|---|---|---|
| 322,457 | A | * 7/1885 | Koch | E21B 17/046 |
| | | | | 285/330 |
| 528,418 | A | * 10/1894 | Duckham | B65G 53/12 |
| | | | | 406/126 |

(Continued)

FOREIGN PATENT DOCUMENTS

| | | | | |
|---|---|---|---|---|
| CN | 106232223 A | 2/2015 | | |
| DE | 3118324 A1 | * 11/1982 | | B65G 51/18 |

(Continued)

OTHER PUBLICATIONS

Machine translation of DE 3118324 A1 (Nov. 1982). Retrieved from Espacenet on Aug. 23, 2019. (Year: 2019).*

(Continued)

*Primary Examiner* — Jennifer A Leung

(57) ABSTRACT

A lift engager for providing a stream of fluidized catalyst particles with an adjustable conduit and process using the lift engager. The lift engager includes a vessel with an inlet configured to receive catalyst from a reaction zone. A first conduit, within the vessel, is configured to supply lift gas into the lift engager. The first conduit includes a fixed member and a movable member secured to the fixed member and is configured to adjust a length of the first conduit within the vessel. A second conduit inside the first conduit and configured to provide fluidized catalyst to a regeneration zone.

14 Claims, 3 Drawing Sheets

(51) Int. Cl.
    *C01B 3/00*     (2006.01)
    *B01J 4/00*     (2006.01)
    *C10G 35/10*     (2006.01)
    *C10G 49/10*     (2006.01)
    *C10G 29/20*     (2006.01)

(56) References Cited

U.S. PATENT DOCUMENTS

| | | | | |
|---|---|---|---|---|
| 2,649,340 A | * | 8/1953 | Weinrich | B01J 8/0025 406/142 |
| 2,699,363 A | * | 1/1955 | Weinrich | B01J 8/0025 406/142 |
| 4,265,572 A | * | 5/1981 | Bourdois | B65G 53/42 406/114 |
| 4,603,887 A | * | 8/1986 | Mayfield | E21B 21/02 285/298 |
| 5,338,440 A | | 8/1994 | Sechrist et al. | |
| 7,067,107 B2 | | 6/2006 | Hinton et al. | |
| 2005/0274648 A1 | | 12/2005 | Goldstein et al. | |

FOREIGN PATENT DOCUMENTS

| | | | | |
|---|---|---|---|---|
| EP | 439388 B1 | | 6/1993 | |
| FR | 1056672 A | * | 3/1954 | ............ B65G 53/00 |
| GB | 1412693 A | * | 11/1975 | ............ B65G 53/14 |
| GB | 2353019 A | * | 2/2001 | ............ B65G 53/42 |

OTHER PUBLICATIONS

Shah, Milinkumar T., Mayne, Jeff, Utikar, Ranjeet, Tade, Moses O., Pareek, Vishnu K., Gas-Solid Fow Hydrodynamics of an Industrial Scale Catalyst Lift Engager, Chemical Engineering Journal, vol. 159, Issues 1-3, May 1, 2010, pp. 138-148, Kwinana, Western Australia 6167, Australia (Abstract only).

* cited by examiner

US 10,562,001 B2

ADJUSTABLE LIFT ENGAGER

FIELD OF THE INVENTION

The present invention is directed toward a lift engager configured to provide a stream of fluidized catalyst, and more particularly to a lift engager with an adjustable conduct for adjusting the flow of the stream of fluidized catalyst.

BACKGROUND OF THE INVENTION

Catalytic processes for the conversion of hydrocarbons are well known and extensively used. Invariably catalysts used in these processes become deactivated for one or more reasons. Where the accumulation of coke deposits often causes the deactivation, reconditioning of the catalyst to remove coke deposits helps restore the activity of the catalyst. Coke is normally removed from catalyst by contact of the coke-containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In order to transport catalyst from a reaction zone containing hydrocarbons to a regeneration zone containing oxygen, the two zones are ordinarily connected by one or more lines or conduits. The two zones generally operate at different pressures and contain different fluids which preferably are inhibited from communicating with one another.

Accordingly, various devices are provided for separating the catalyst from the hydrocarbon products, and for providing a fluidized stream of catalyst to the regeneration zone. One such device is known as a lift engager. An exemplary lift engager is shown in U.S. Pat. No. 5,338,440 the entirety of which is incorporated herein. Such lift engager comprises a pair of concentric conduits within a vessel. In the annulus between the concentric conduits, the outer conduit provides a gas that is used, inter alia, to lift catalyst particles out of the vessel through the inner conduit.

While such devices are presumably effective for their intended uses, conventional lift engagers utilize concentric conduits that are both fixed. In other words, within the vessel, the length of the conduits cannot be easily adjusted. Furthermore, after installation, once the processing unit with the lift engager is operating, it is time consuming and arduous process to adjust the length of the conduits. Additionally, the processing unit must be stopped or at a minimum have its throughput reduced so that the vessel is disassembled. Once the vessel is disassembled, one or both of the conduits are permanently cut with tools.

Therefore, there remains a need for a lift engager that does not require such a time consuming process in order to adjust the conduits of the lift engager. It would particularly be desirable to also provide a lift engager that did not require the processing unit to be shut down when adjusting the length of the conduits.

SUMMARY OF THE INVENTION

The present invention provides a lift engager that solves one or more of the problems discussed above. Specifically, the present invention provides a lift engager that includes concentric conduits. At least one of the conduits, preferably, the outer conduit, has an adjustable length (relative to the top of the vessel or the bottom of the vessel). Although not required, it is further contemplated that the adjustable pipe is adjusted without removing the vessel of the lift engager.

Accordingly, in one or more broad aspects of the present invention, the present invention provides a lift engager configured to provide a stream of fluidized catalyst particles including: a vessel with an inlet configured to receive catalyst from a reaction zone; a first conduit within the vessel configured to supply lift gas into the lift engager, the first conduit comprising a fixed member and a movable member secured to the fixed member and configured to adjust a length of the first conduit within the vessel; and, a second conduit inside the first conduit and configured to provide fluidized catalyst to a regeneration zone.

Additionally, in at least one general aspect of the present invention, a lift engager for providing fluidized catalyst particles is provided which includes: a vessel with an inlet configured to receive catalyst; a first conduit within the vessel configured to supply lift gas into the lift engager, the first conduit comprising a fixed member, a sleeve secured to the fixed member, and a movable member engaging the sleeve and configured to move relative to the fixed member to adjust a length of the first conduit within the vessel; and, a second conduit inside of the first conduit and configured to provide fluidized catalyst.

Furthermore, in one or more broad aspects of the present invention, the present invention provides a process for providing fluidized catalyst by: passing catalyst particles from a reaction zone to a vessel; passing a stream of fluidizing gas into the vessel via a first conduit, wherein the first conduit comprises a fixed member, a sleeve rotatably secured to the fixed member, and a movable member engaging the sleeve, the moveable member configured to move in relative to the fixed member to adjust a length of the first conduit; passing fluidized catalyst to a regeneration zone through a second conduit, wherein within the vessel the second conduit extends within the first conduit.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

Figure 1:
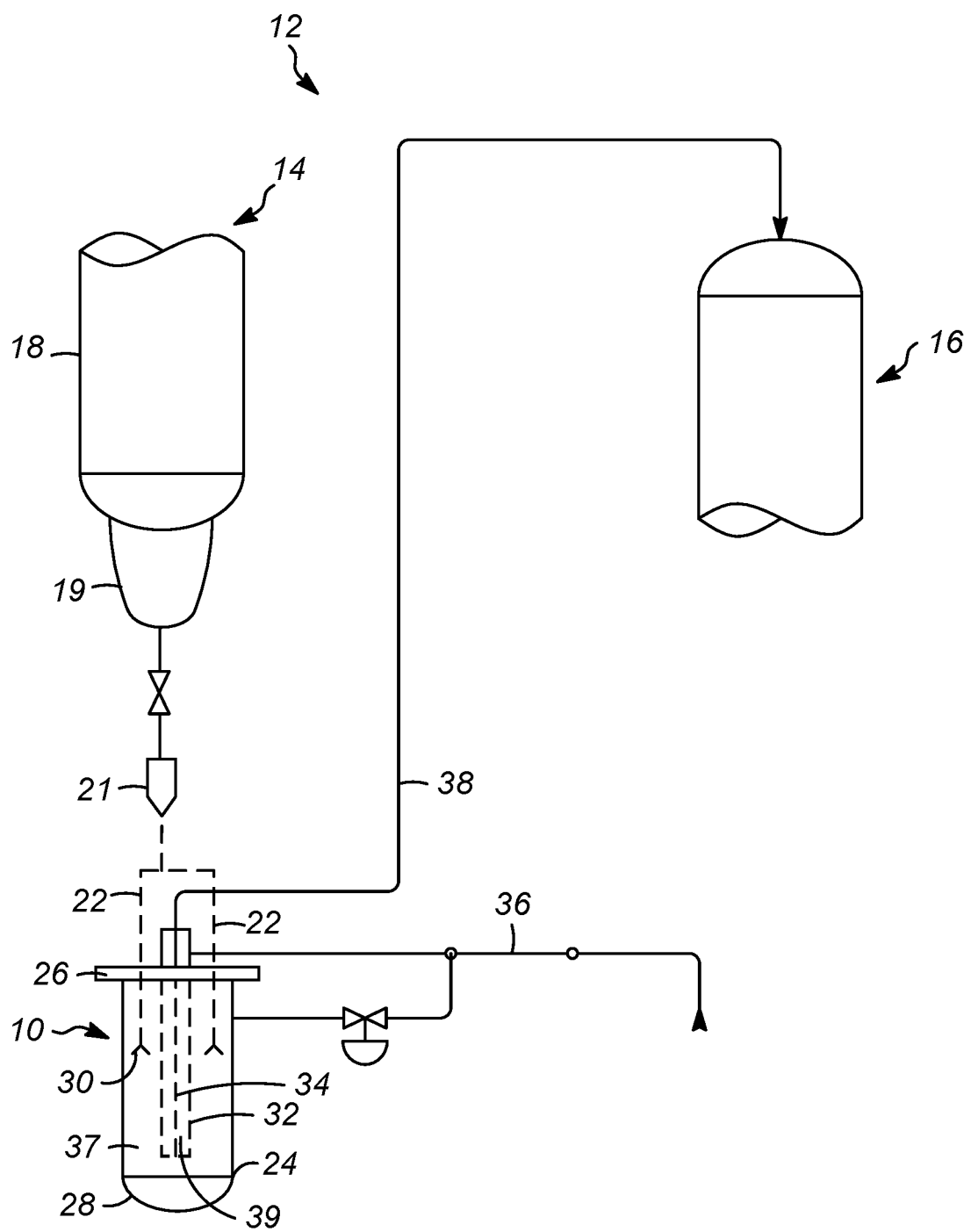
FIG. 1 shows a partial schematic process flow drawing according to one or more embodiments of the present invention.

As discussed above, the present invention provides a lift engager that includes an adjustable conduit. This allows for the adjustment, preferably an online adjustment, of the lift gap without requiring the lift conduits to be removed or cut. In other words, the processing unit does not need to shut down when adjusting the length of one of the conduits. As will be appreciated, allowing the processing unit to operate while the conduit is being adjusted avoids operating losses from lost processing time from reducing or shutting down the throughput for the processing unit associated with conventional processes. The present lift engager can be installed on existing processing units with minor modifications or installed on new processing units to provide the ability to adjust the lift gap without opening the lift engager. Additionally, to allow the user to adjust the gap in even increments without having to physically measure the gap, the lift engager can utilize a ratcheting mechanism, or the like.

Accordingly, with reference to FIG. 1, the present invention will be described in more detail with the understanding that this description is not intended to be limiting. A lift engager 10 is typically installed in a processing unit 12 between a reaction zone 14 and a regeneration zone 16.

The reaction zone 14 includes a reactor 18 employed in any one of a variety of hydrocarbon conversion reactions including catalytic reforming, fixed-bed alkylation, hydrorefining, hydrocracking, dehydrogenation, hydrogenation, steam reforming, etc. The catalysts used in these processes are maintained in the reactor zone 14. Over time, the catalyst in the reaction zone 14 generally becomes deactivated because of the accumulation of coke deposits. Regeneration of the catalyst to remove the coke deposits helps restore the activity of the catalyst. Coke deposits are generally removed from the catalyst by contacting the catalyst with an oxygen-containing gas to combust and remove the coke in the regeneration zone 16. Many of these processing unit 12 include the reaction zone 14 and the regeneration zone 16 in side-by-side relation to each other. In these systems, the catalyst is continuously or semi-continuously removed from the reaction zone 14 and transferred to the regeneration zone 16 for coke removal. Following coke removal, the catalyst is removed from the regeneration zone 16 and transferred back to the reaction zone 14 (not depicted but known to those of ordinary skill in the art).

The most widely practiced hydrocarbon conversion process to which the present invention is applicable is catalytic reforming. Therefore, the discussion herein of the present invention will be in reference to its application to a catalytic reforming reaction system. It is not intended that this discussion limit the scope of the present invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. No. 4,119,526 (Peters et al.); U.S. Pat. No. 4,409,095 (Peters); and U.S. Pat. No. 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The particles are usually spheroidal and have a diameter of from about $\frac{1}{16}$th to about $\frac{1}{8}$th inch (1.5-3.1 mm), though they may be as large as $\frac{1}{4}$th inch (6.35 mm). In a particular reaction-regeneration system, however, it is desirable to use catalyst particles which fall in a relatively narrow size range. A preferred catalyst particle diameter is $\frac{1}{16}$th inch (1.6 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In a preferred form, the reformer will employ a moving bed reaction zone and regeneration zone. The present invention is applicable to a moving bed regeneration zone and a fixed bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a multi-step regeneration process is used to remove the coke deposits and recondition the catalyst to restore its full reaction promoting ability. The art of moving bed regeneration zones is well known and does not require detailed description herein. What is important is that the regeneration zone contains oxygen and generally operates in excess of 700° F. (370° C.). Catalyst flows by gravity through the various regeneration steps and then is withdrawn from the regeneration zone and furnished to the reaction zone. Catalyst that is withdrawn from the regeneration zone is termed regenerated catalyst. Movement of catalyst through the zones is often referred to as continuous though, in practice, it may be semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

In FIG. 1, the reaction zone 14 and the regeneration zone 16 are, in a preferred configuration, in side-by-side relation. The reaction zone 14 may be maintained independently with its own atmosphere and at its own pressure by any suitable means, and such means are not essential elements of the present invention. An effluent stream comprising catalyst particles and hydrocarbon is withdrawn from the reaction zone 14 and passed to the lift engager 10.

As will be appreciated, although not depicted in FIG. 1, there may be one or more various structures between the reactor 18 and the lift engager 10 that separate the catalyst from the hydrocarbons. For example, in some reactors 18, there is a catalyst collector 19 between the reactor 18 and the lift engager 10. Additionally, from a catalyst collector 19, the catalyst may be passed to a lock hopper 21 before being passed to the lift engager 10. Within a reaction zone 14, the structures between different reactors and the respective lift engagers may differ. Regardless of the exact structure, between the reactor 18 and the lift engager 10, hydrogen and hydrocarbon(s) are purged or separated from the catalyst particles. Accordingly, a variety of different shapes and internal baffles may be utilized to help ensure adequate purging and provide a stream of catalyst via one or more catalyst-transfer pipes 22

Specifically, the lift engager 10 includes a vessel or shell 24 having a top 26 and a bottom 28. The lift engager 10 includes an inlet 30 for receiving the catalyst from the reaction zone 12, such as via the catalyst-transfer pipes 22. A pair of concentric conduits 32, 34 extend downward in the shell 24 away from the top 26 and toward the bottom 28. The annular space 37 between the outer conduit 32 and the interior wall of the lift-engager 10 is filled with catalyst from, for example, the catalyst-transfer pipes 22.

Due to the presence of a fluidizing gas in the lift engager 10, via line 36 for example, a stream of fluidized catalyst is withdrawn from the lift engager 10 through the inner conduit 34 and is passed to the regeneration zone 16 via line 38. The fluidizing gas 36 is supplied to the lift engager 10 through the annular zone 39 between the two concentric conduits 32, 34. Additionally, fluidizing gas may also be passed directly into the annular space 37 between the outer conduit 32 and the interior wall of the lift-engager 10. As would be appreciated, the exact composition of the fluidizing gas 36 depends on the reactor 18 and can be, for example, nitrogen or hydrogen.

As mentioned at the outset, the lengths of the conduits 32, 34 within the vessel 24 (i.e., the distance from the top 26 to the end of the conduit 32, 34 or the distance from the bottom 28 to the end of the conduit 32, 34) may need to be adjusted. Accordingly, in accordance with the present invention, at least one of the conduits 32, 34 has an adjustable length.

Figure 2:
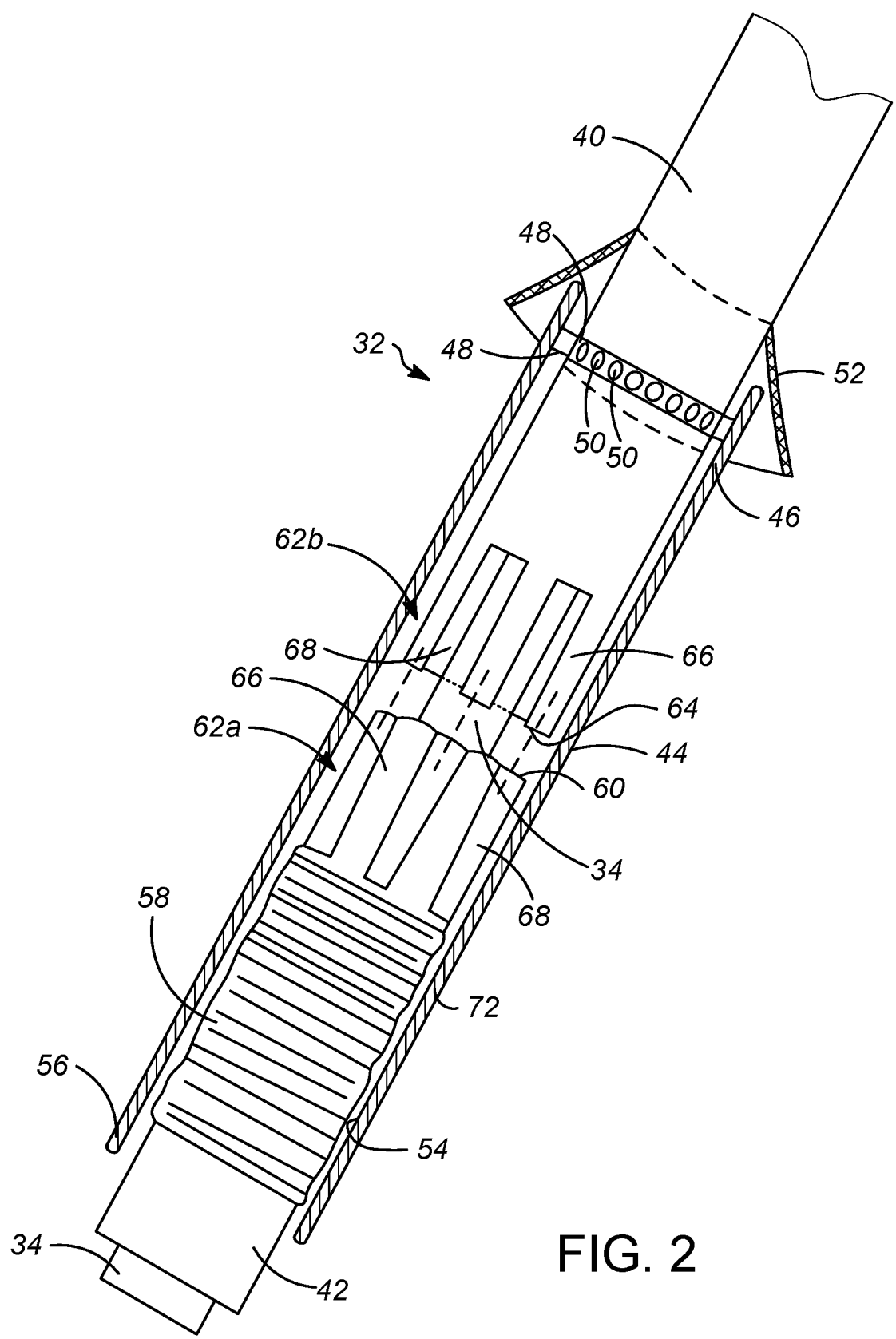
FIG. 2 shows a perspective partial cutaway of a lift engager according to one or more embodiments of the present invention; and, FIG. 3 shows a top cutaway of a lift engager according to one or more embodiments of the present invention.

Turning to FIG. 2, in a preferred embodiment, the outer conduit 32 is provided with an adjustable length with two members. As depicted, the outer conduit 32 comprises a fixed member 40 and a moveable member 42. The inner conduit 34 passes through both members 40, 42. Once installed in the vessel 24, the positioning of the fixed member 40 relative to the top 26 or the bottom 28 of the vessel 24 does not change. In contrast, the positioning of the moveable member 42 can be changed relative to the top 26 or the bottom 28 of the vessel 24. The fixed member 40 and the movable member 42 are secured to each other in a manner that allows the movable member 42 to adjust a length of the outer conduit 32 within the vessel 24.

Additionally, the outer conduit 32 includes a cylindrical sleeve 44 having a first end 46 rotateably secured to the fixed member 40 with at least detent 48 and plurality of bearings 50. A collar or deflector 52 is installed around the fixed member 40 and covers the first end 46 to minimize catalyst particles from flowing therein. It is not required that the collar 52 provide a gas tight seal between the fixed member 40 and the cylindrical sleeve 44.

A portion of an inner surface 54 of the cylindrical sleeve 44, preferably, starting at the second end 56 of the cylindrical sleeve 44, is threaded. A portion of an outer surface 58 of the moveable member 42 is also threaded and configured to engage the threaded portion of the inner surface 54 of the cylindrical sleeve 44. One end 60 of the moveable member 42 includes engagement members 62a, and one end 64 of the fixed member 40 includes engagement members 62b configured complementarily to the engagement members 62a, 62b of the moveable member 42. The interference between the engagement members 62a, 62b prevents rotation of the movable member 42 relative to the fixed member 40. In the depicted embodiment, the engagement members 62a, 62b are a plurality of alternating teeth 66 and gaps 68 where the teeth 66 of one of the members 40, 42 is configured to be received in the gaps 68 of the other member 40, 42.

In use, the sleeve 44 is rotated. Due to the engagement between the threaded portion of the inner surface 54 and the threaded portion of the outer surface 58 and the interference between the engagement members 62a, 62b, the moveable member 42 moves (up and down relative to the drawing). This configuration is merely preferred and other structures can be used to adjust the positioning of the moveable member 42 within the vessel 24 and in relative to the fixed member 40 in order to adjust the length of the first conduit 32.

Figure 3:
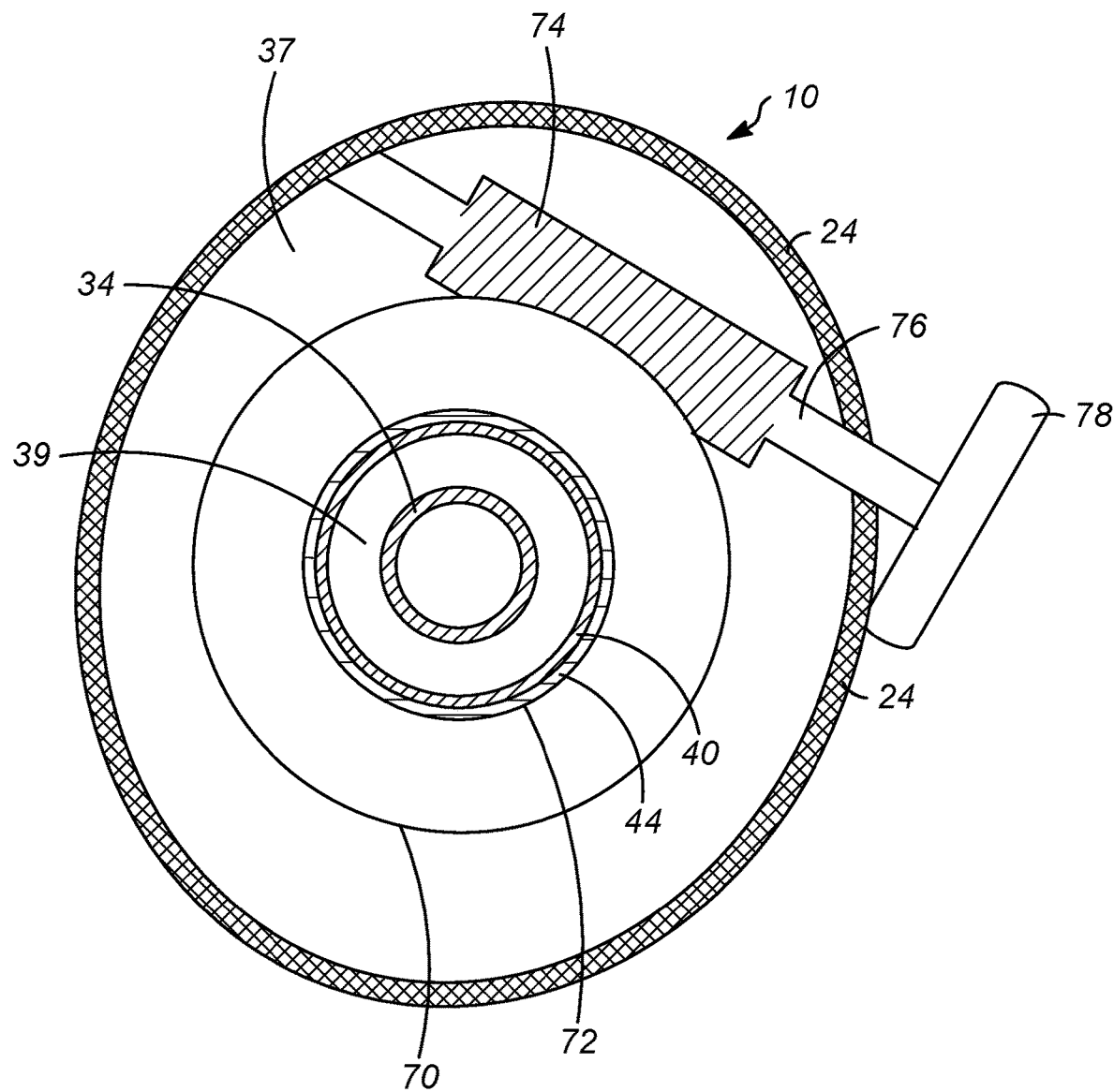

While such an arrangement will allow of the length of the outer conduit 32 to be adjusted in a manner that is less time consuming than prior processes, it is especially desired if the outer conduit 32 is adjusted while inside the vessel 24. Accordingly, as shown in FIG. 3, a worm gear 70 is disposed on an outer surface 72 of the cylindrical sleeve 44. The worm gear 70 may be integrally formed with the cylindrical sleeve 44, or it may be coupled to the outer surface 72 of the cylindrical sleeve 44 in a conventional manner (adhesive, bonded, welded, etc.). The worm gear 70 engages with a worm 74 on a worm shaft 76. As is known, the worm 74 translates a rotational movement of the worm shaft 76 to a rotational movement of the worm gear 70. The worm shaft 76 preferably extends out of the vessel 24, meaning that the worm shaft 76 is configured to receive a rotational movement originating outside of the vessel 24. Rotation of the worm shaft 76, via a handle 78 or motor, thus is translated into rotation of the worm gear 70 by the worm 74 on the worm shaft 76. This will rotate the cylindrical sleeve 44 due to the coupling of the worm gear 70 and the cylindrical sleeve 44. As mentioned above, the rotation of the cylindrical sleeve 44 displaces the moveable member 42 and adjusts a length of the outer conduit 32.

It is preferred that the threaded portion of the inner surface 54 and the threaded portion of the outer surface 58 are configured so that one revolution of the cylindrical sleeve 44 displaces the moveable member 42 a predetermined distance, for example 4 mm. Using known structures like a ratcheting mechanism, each quarter rotation of the cylindrical sleeve 44 preferably generates an audible indictor, such a click. Accordingly, when adjusting the length of the outer conduit 32, the change in length can be easily recognized and appreciated.

When used in a process that provides fluidized catalyst, the lift engager 10 allows for the length of the outer conduit 32 to be adjusted without requiring a shut down or reduction in throughput of the processing unit. Furthermore, the adjustment can be made in order to accommodate processing conditions, providing for improved processing.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

SPECIFIC EMBODIMENTS

While the following is described in conjunction with specific embodiments, it will be understood that this description is intended to illustrate and not limit the scope of the preceding description and the appended claims.

A first embodiment of the invention is a lift engager for providing a stream of fluidized catalyst particles, the engager comprising a vessel with an inlet configured to receive catalyst from a reaction zone; a first conduit within the vessel configured to supply lift gas into the lift engager, the first conduit comprising a fixed member and a movable member secured to the fixed member and configured to adjust a length of the first conduit within the vessel; and, a second conduit inside the first conduit and configured to provide fluidized catalyst to a regeneration zone. An embodiment of the invention is one, any or all of prior embodiments in this paragraph up through the first embodiment in this paragraph wherein the fixed member includes a first end, and wherein the movable member comprises a first end, and wherein the first end of the fixed member and the first end of the moveable member are configured complementarily to engage each other and prevent rotation of the movable member relative to the fixed member. An embodiment of the invention is one, any or all of prior embodiments in this paragraph up through the first embodiment in this paragraph, wherein both first ends comprise a plurality of alternating teeth and gaps, the teeth of one first end configured to be received in the gaps of the other first end. An embodiment of the invention is one, any or all of prior embodiments in this paragraph up through the first embodiment in this paragraph, further comprising a sleeve disposed about both of the fixed member and the movable member. An embodiment of the invention is one, any or all of prior embodiments in this paragraph up through the first embodiment in this paragraph, wherein the sleeve includes an inner surface comprising threads, and wherein the moveable member includes an outer surface comprising threads configured to engage the threads of the inner surface of the sleeve. An embodiment of the invention is one, any or all of prior embodiments in this paragraph up through the first embodiment in this paragraph further comprising a collar secured to the fixed member and extending over a first end of the sleeve. An embodiment of the invention is one, any or all of prior embodiments in this paragraph up through the first embodiment in this paragraph wherein an outer surface of the sleeve comprises a worm gear. An embodiment of the invention is one, any or all of prior embodiments in this paragraph up through the first embodiment in this paragraph further comprising a shaft engaging the worm gear and extending out of the vessel and configured to rotate in or to cause the sleeve to rotate relative to the fixed member. An embodiment of the invention is one, any or all of prior embodiments in this paragraph up through the first embodiment in this paragraph further comprising a detent on the outer surface of the fixed member, and, wherein the sleeve comprises a plurality of bearings configured to engage the detent on the outer surface of the fixed member.

A second embodiment of the invention is a lift engager for providing fluidized catalyst particles, the lift engager comprising a vessel with an inlet configured to receive catalyst; a first conduit within the vessel configured to supply lift gas into the lift engager, the first conduit comprising a fixed member, a sleeve secured to the fixed member, and a movable member engaging the sleeve and configured to move relative to the fixed member to adjust a length of the first conduit within the vessel; and, a second conduit inside of the first conduit and configured to provide fluidized catalyst. An embodiment of the invention is one, any or all of prior embodiments in this paragraph up through the second embodiment in this paragraph further comprising a detent on an outer surface of the fixed member, and, wherein the sleeve comprises a plurality of bearings configured to engage the detent. An embodiment of the invention is one, any or all of prior embodiments in this paragraph up through the second embodiment in this paragraph, wherein the sleeve includes an inner surface comprising threads, and wherein the moveable member includes an outer surface comprising threads configured to engage the threads of the inner surface of the sleeve. An embodiment of the invention is one, any or all of prior embodiments in this paragraph up through the second embodiment in this paragraph, wherein the fixed member includes a first end, and wherein the movable member comprises a first end, and wherein the first end of the fixed member and the first end of the moveable member are configured complementarily to engage each other and prevent rotation of the movable member relative to the fixed member. An embodiment of the invention is one, any or all of prior embodiments in this paragraph up through the second embodiment in this paragraph, wherein both first ends comprise a plurality of alternating teeth and gaps, the teeth of one first end configured to be received in the gaps of the other first end. An embodiment of the invention is one, any or all of prior embodiments in this paragraph up through the second embodiment in this paragraph wherein the outer surface of the sleeve comprises a worm gear. An embodiment of the invention is one, any or all of prior embodiments in this paragraph up through the second embodiment in this paragraph further comprising a shaft engaging the worm gear and extending out of the vessel and configured to rotate to adjust a position of the moveable member relative to the fixed member. An embodiment of the invention is one, any or all of prior embodiments in this paragraph up through the second embodiment in this paragraph further comprising a collar secured to the fixed member and extending over a first end of the sleeve.

A third embodiment of the invention is a process for providing fluidized catalyst, the process comprising passing catalyst particles from a reaction zone to a vessel; passing a stream of fluidizing gas into the vessel via a first conduit, wherein the first conduit comprises a fixed member, a sleeve rotatably secured to the fixed member, and a movable member engaging the sleeve, the moveable member configured to move in relative to the fixed member to adjust a length of the first conduit; passing fluidized catalyst to a regeneration zone through a second conduit, wherein within the vessel the second conduit extends within the first conduit. An embodiment of the invention is one, any or all of prior embodiments in this paragraph up through the third embodiment in this paragraph further comprising rotating the sleeve in order to adjust a length of the first conduit. An embodiment of the invention is one, any or all of prior embodiments in this paragraph up through the third embodiment in this paragraph further comprising rotating a shaft extending out of the vessel in order to rotate the sleeve of the first conduit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A lift engager for providing a stream of fluidized catalyst particles, the lift engager comprising:
    a vessel with an inlet configured to receive catalyst from a reaction zone;
    a first conduit within the vessel configured to supply lift gas into the lift engager, the first conduit comprising a fixed member and a movable member secured to the fixed member and configured to adjust a length of the first conduit within the vessel;
    a second conduit inside the first conduit and configured to provide fluidized catalyst to a regeneration zone;
    a sleeve disposed about both of the fixed member and the movable member, wherein the sleeve includes an inner surface comprising threads, and wherein the movable member includes an outer surface comprising threads configured to engage the threads of the inner surface of the sleeve; and
    a collar secured to the fixed member and extending over a first end of the sleeve.

2. The lift engager of claim 1 wherein the fixed member includes a first end, and wherein the movable member comprises a first end, and wherein the first end of the fixed member and the first end of the moveable member are configured complementarily to engage each other and prevent rotation of the movable member relative to the fixed member.

3. The lift engager of claim 2, wherein both first ends comprise a plurality of alternating teeth and gaps, the teeth of one first end configured to be received in the gaps of the other first end.

4. The lift engager of claim 1 wherein an outer surface of the sleeve comprises a worm gear.

5. The lift engager of claim 4 further comprising:
    a shaft engaging the worm gear and extending out of the vessel and configured to rotate in or to cause the sleeve to rotate relative to the fixed member.

6. The lift engager of claim 4 further comprising:
    a detent on the outer surface of the fixed member, and,
    wherein the sleeve comprises a plurality of bearings configured to engage the detent on the outer surface of the fixed member.

7. A lift engager for providing fluidized catalyst particles, the lift engager comprising:
    a vessel with an inlet configured to receive catalyst;
    a first conduit within the vessel configured to supply lift gas into the lift engager, the first conduit comprising a fixed member, a sleeve secured to the fixed member, and a movable member engaging the sleeve and configured to move relative to the fixed member to adjust a length of the first conduit within the vessel;
    a second conduit inside of the first conduit and configured to provide fluidized catalyst; and
    a detent on an outer surface of the fixed member,
    wherein the sleeve comprises a plurality of bearings configured to engage the detent.

8. The lift engager of claim 7, wherein the sleeve includes an inner surface comprising threads, and wherein the moveable member includes an outer surface comprising threads configured to engage the threads of the inner surface of the sleeve.

9. The lift engager of claim 8, wherein the fixed member includes a first end, and wherein the movable member comprises a first end, and wherein the first end of the fixed member and the first end of the moveable member are configured complementarily to engage each other and prevent rotation of the movable member relative to the fixed member.

10. The lift engager of claim 9, wherein both first ends comprise a plurality of alternating teeth and gaps, the teeth of one first end configured to be received in the gaps of the other first end.

11. The lift engager of claim 7 wherein the outer surface of the sleeve comprises a worm gear.

12. The lift engager of claim 11 further comprising:
    a shaft engaging the worm gear and extending out of the vessel and configured to rotate to adjust a position of the moveable member relative to the fixed member.

13. The lift engager of claim 7 further comprising:
    a collar secured to the fixed member and extending over a first end of the sleeve.

14. A process for providing fluidized catalyst, the process comprising:
    passing catalyst particles from a reaction zone to a vessel;
    passing a stream of fluidizing gas into the vessel via a first conduit, wherein the first conduit comprises a fixed member, a sleeve rotatably secured to the fixed member, and a movable member engaging the sleeve, the moveable member configured to move in relative to the fixed member to adjust a length of the first conduit;
    passing fluidized catalyst to a regeneration zone through a second conduit, wherein within the vessel the second conduit extends within the first conduit; and
    rotating a shaft extending out of the vessel in order to rotate the sleeve of the first conduit to adjust a length of the first conduit.

* * * * *